(12) United States Patent
Forsberg

(10) Patent No.: US 9,065,101 B2
(45) Date of Patent: Jun. 23, 2015

(54) FUEL INJECTION SYSTEM AND METHOD FOR INJECTING HYDROCARBON FUEL INTO A FUEL REFORMER

(75) Inventor: Peter Forsberg, Göteborg (SE)

(73) Assignee: POWERCELL SWEDEN AB, Göteborg (SE)

( * ) Notice: Subject to any disclaimer, the term of this patent is extended or adjusted under 35 U.S.C. 154(b) by 747 days.

(21) Appl. No.: 13/255,512

(22) PCT Filed: Mar. 13, 2009

(86) PCT No.: PCT/SE2009/000137
§ 371 (c)(1),
(2), (4) Date: Nov. 15, 2011

(87) PCT Pub. No.: WO2010/104423
PCT Pub. Date: Sep. 16, 2010

(65) Prior Publication Data
US 2012/0111964 A1    May 10, 2012

(51) Int. Cl.
*F02D 1/06* (2006.01)
*F02M 7/00* (2006.01)
*H01M 8/06* (2006.01)
*C01B 3/34* (2006.01)

(52) U.S. Cl.
CPC .............. *H01M 8/0612* (2013.01); *Y02E 60/50* (2013.01); *C01B 3/34* (2013.01); *C01B 2203/0233* (2013.01); *C01B 2203/12* (2013.01)

(58) Field of Classification Search
CPC .......... F02M 25/10; F02M 25/12; C01B 3/26; C01B 2203/0277; Y02T 10/121; Y02E 60/50; H01M 8/0612

USPC ............ 60/286; 239/88, 533.2, 585.1, 5, 124; 123/459, 446, 447, 511
See application file for complete search history.

(56) References Cited

U.S. PATENT DOCUMENTS

| | | | |
|---|---|---|---|
| 2003/0101713 A1* | 6/2003 | Dalla Betta et al. | 60/284 |
| 2004/0202592 A1 | 10/2004 | Rabinovich et al. | |
| 2007/0028905 A1* | 2/2007 | Shinagawa et al. | 123/575 |
| 2008/0016850 A1* | 1/2008 | Shamis et al. | 60/286 |
| 2008/0022660 A1* | 1/2008 | Reuter et al. | 60/286 |
| 2009/0151323 A1* | 6/2009 | Severin et al. | 60/276 |

FOREIGN PATENT DOCUMENTS

| | | |
|---|---|---|
| WO | 0176731 A1 | 10/2001 |
| WO | 2007002599 A3 | 1/2007 |

OTHER PUBLICATIONS

International Search Report for corresponding International Application PCT/SE2009/000137.
International Preliminary Report on Patentability for corresponding International Application PCT/SE2009/000137.

* cited by examiner

*Primary Examiner* — Dinh Q Nguyen
(74) *Attorney, Agent, or Firm* — WRB-IP LLP

(57) ABSTRACT

A fuel injection system and method for injecting hydrocarbon fuel into a fuel reformer for generating hydrogen rich gas from hydrocarbon fuel are provided. The hydrocarbon fuel is injected into the fuel reformer as spray having a pulsating pressure.

12 Claims, 1 Drawing Sheet

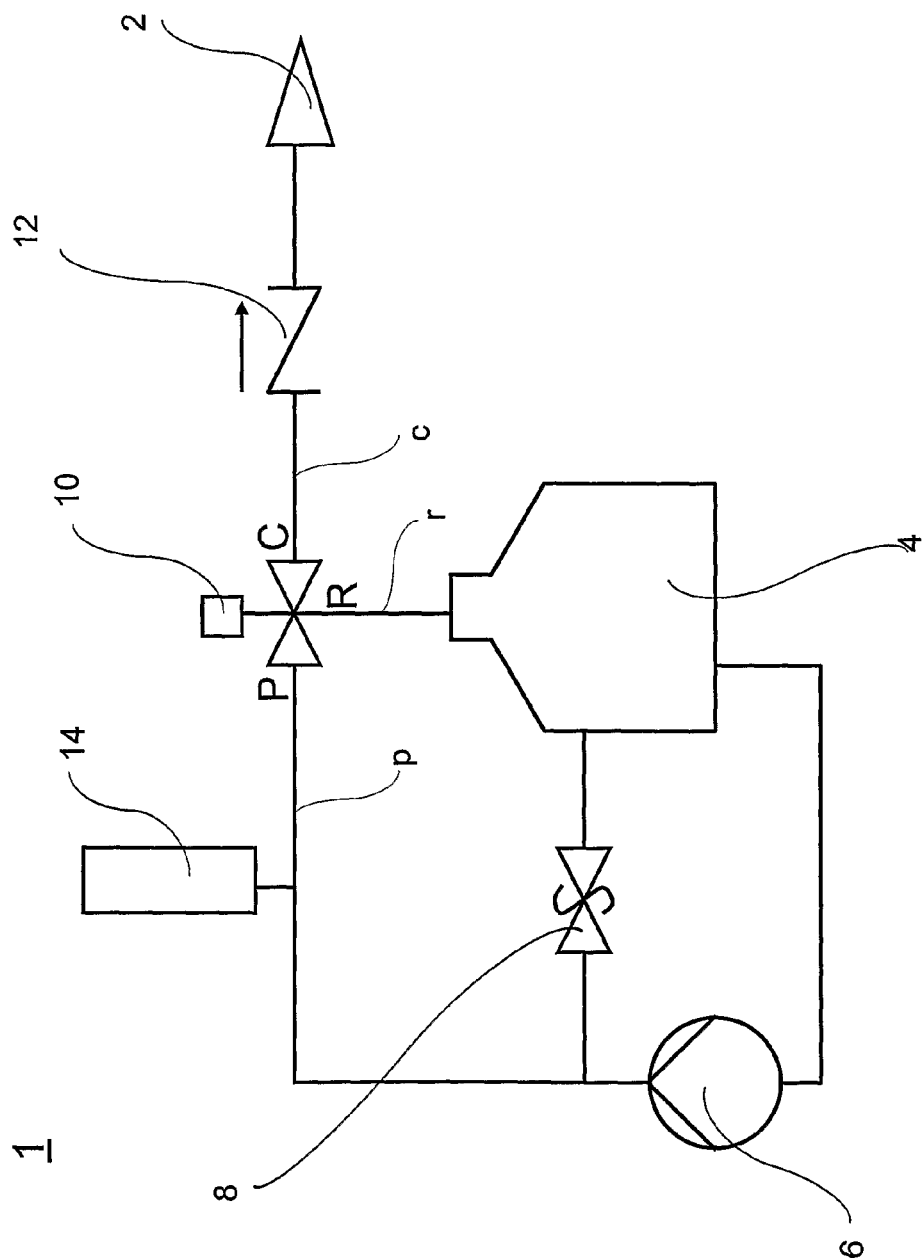

FUEL INJECTION SYSTEM AND METHOD FOR INJECTING HYDROCARBON FUEL INTO A FUEL REFORMER

BACKGROUND AND SUMMARY

The present invention relates to a fuel injection system and a method for injecting hydrogen fuel, in particular liquid hydrocarbon fuel, into a fuel reformer for generating a hydrogen rich gas from said hydrocarbon fuel, wherein said hydrocarbon fuel is sprayed into the fuel reformer.

Hydrogen rich gas can be used as an intermediate product in order to produce eventually hydrogen. Hydrogen can be used for many different purposes. For instance, hydrogen is necessary for the operation of fuel cells which provide electric energy for a vehicle or other applications. Hydrogen can be directly stored in a tank, but this storage is technically complicated and dangerous due to the explosiveness of hydrogen. Therefore, it has proven useful to generate a hydrogen rich gas from (preferably liquid) hydrocarbon fuel through catalytic conversion.

The catalytic conversion of the hydrocarbon chains contained in the hydrocarbon fuel is well-known and is therefore only summarized in the following. Usually, the conversion is carried out in several successive steps, comprising the step of the actual reforming, in which the hydrocarbon chains contained in the liquid hydrocarbon fuel are broken down and eventually converted into a hydrogen rich gas comprising hydrogen, carbon monoxide, carbon dioxide, steam and usually also to a certain extent remaining hydrocarbon chains in accordance with the thermodynamic equilibrium.

The hydrogen rich gas is then further processed in subsequent stages in a well-known manner in order to produce hydrogen in the required degree of purity, for instance by applying subsequent staged shift reactions, during which carbon monoxide and water are catalytically converted to carbon dioxide and hydrogen, and, if necessary, by applying subsequent cleaning processes in which other unwanted substances in the hydrogen rich gas (as for instance the remaining hydrocarbon chains) are removed or converted into chemical compounds that do not harm the use of the hydrogen eventually produced at the end of the total hydrogen production process.

For the first step in this process, namely the catalytic conversion of hydrocarbon fuel to a hydrogen rich gas, a so called fuel reformer is used. For good operating modes of the fuel reformer it has been shown that a successful and efficient conversion of a hydrocarbon fuel into a hydrogen rich gas is, among others, dependent on a successful mixing of the reactants. For that mixing it has proven useful to spray the hydrocarbon fuel into the fuel reformer, whereby a good atomization or vaporization of the hydrocarbon fuel can be achieved.

Disadvantageously, when liquid hydrocarbon fuel is used in a fuel reformer, it is difficult to regulate the amount of injected hydrocarbon fuel and at the same time keep a high quality of the spray regarding degree of atomization or vaporization and of mixture with other reactants like water or steam.

In practice, a fuel reformer needs to be operated in a wide range of fuel flow rates, e.g. between 2.5 g-25 g fuel per minute. Usually, the operational range of the fuel reformer is expressed in terms of a fixed ratio of the minimum flow rate (in the example above: 2.5 g fuel per minute) to the maximum flow rate (in the example above: 25 g fuel per minute). This ratio is called the "turn down ratio", whereby in the example above the turn down ratio is 1:10. In general, a high turn-down ratio is desired, which means at the same time that the fuel reformer can be operated in a wide range of fuel flow rates.

However, in practice it is rather difficult to design a fuel injection element which produces an optimal spray or atomization of the fuel over a wide range of fuel flow rates. Usually, the geometry of the fuel injection element is designed for one fuel flow rate, e.g. either the above mentioned minimum flow rate of 2.5 g per minute or the above mentioned maximum fuel flow rate of 25 g per minute. Thereby, the atomization of the fuel spray can be influenced by a plurality of different parts of the fuel injection element. For an easier understanding, the design problem will be described using the example of the size of the fuel spray outlet hole.

For example the size of the fuel spray outlet hole can be either optimized for the minimum flow or the maximum flow. In case the size of the hole is designed for achieving a good atomization of the fuel spray for a low fuel amount (small hole), e.g. 2.5 g per minute, the size of the hole will be rather small and it will be very difficult to force a higher fuel amount, e.g. 25 g per minute through such small hole, without increasing the pressure of the fuel before the hole excessively. On the other hand, if the size of the hole is designed for achieving a good atomization of the fuel spray for a high fuel amount, e.g. 25 g per minute, (large hole), the size of the hole will be rather large and the use of a low fuel amount, e.g. 2.5 g per minute, will not result in an sufficiently atomized fuel spray, but rather in a dribbling of the fuel, as the pressure of the fuel at the hole is too low for the production of an atomized fuel spray. Consequently, to design a nozzle producing a good spray quality for both high and low flow rates using only one standard nozzle design is a problem.

Nevertheless a wide operation range or an increased turn-down ratio, respectively, of the fuel reformer is desired.

For increasing the turn-down ratio, one possibility is to increase the amount of fuel sprayed into the fuel reformer. In general, an increase of the amount of fuel can be achieved by increasing the pressure of hydrocarbon fuel supply, whereby more hydrocarbon fuel is forced to pass through the fuel injection element. This has the disadvantage that the fuel injection element, but also the fuel supply lines, the valves and all other involved parts for supplying fuel to the fuel injection element need to be designed for high pressure applications. Additionally, also the pump in the fuel supply system providing the wanted fuel pressure has to be designed for the necessary high pressure of the fuel. All these factors increase the overall costs of the system.

As already mentioned above, the other possibility to increase the turn down ratio is to design the whole fuel injection element for a higher fuel amount. However, this has the disadvantage that for a low or the minimum fuel flow rate, the degree of vaporization or atomization of the fuel spray in the fuel reformer deteriorates, so that a good mixing of the reactants cannot be provided in the fuel reformer.

It is therefore desirable to provide a cost efficient fuel injection system and method which provides an increased quality of the spray, but also provides an increased turn down ratio.

An aspect of the present invention is based on the idea to provide (i) a fuel injection system for injecting (preferably liquid) hydrocarbon fuel into a fuel reformer, which is adapted to inject a pulsating spray of hydrocarbon fuel into the fuel reformer, and (ii) a method for injecting liquid hydrocarbon fuel into a fuel reformer, said method comprising the step of injecting the hydrocarbon fuel as a pulsating spray of hydrocarbon fuel into the fuel reformer. Preferably, the hydrocarbon fuel is injected by at least one fuel injection element into the fuel reformer.

In a preferred embodiment of an aspect of the invention, the fuel injection system comprises a valve with at least one output port and at least one input port, wherein the at least one output port of the valve is connected to at least one fuel injecting element and the at least one input port of the valve is adapted to receive hydrocarbon fuel from a fuel supply system and wherein the valve is adapted to provide a (liquid or gaseous) hydrocarbon fuel stream having a pulsating pressure.

Preferably, the fuel injection system further comprises a fuel stream stopping element, preferably a check valve, which is adapted to stop the supply of the hydrocarbon fuel stream to the at least one fuel injection element, if the pressure of the fuel stream supplied at the at least one fuel injection element falls below a predetermined threshold value. Otherwise, i.e. if the pressure of the fuel stream supplied at the at least one fuel injection element exceeds (or is at least equal to) the predetermined threshold value, it provides the liquid hydrocarbon fuel stream having the wanted pulsating pressure. Alternatively, the supply of fuel can already be stopped when the pressure of the fuel stream supplied is equal to the predetermined threshold value.

By providing an immediate cut off of the pressure of the fuel at the at least one fuel injection element in case the pressure of the fuel falls below a predetermined value, e.g. below 1.5 bar, the fuel spraying process inside the fuel reformer stops more or less immediately, too. This means that the transition period from (i) fuel spraying in the fuel reformer under full fuel pressure before the cut off to (ii) the stop of the fuel spraying after the cut off is considerably shorter when using such fuel stream stopping element than without using it. The shortening of the transition period by the use of such a fuel stream stopping element in turn reduces considerably the negative impact the decreasing pressure of the fuel at the at least one injection element may have onto the quality of the fuel spray during this transition period.

Preferably, the fuel stream stopping element is arranged near the at least one fuel injection element, e.g. between the output port of the valve and the at least one fuel injection element, and most advantageously it is arranged as near as possible to the fuel spray outlet of the at least one fuel injection element. Thereby, only a rather small amount of fuel, which might produce a fuel spray of lower quality in the fuel reformer due to the decreasing fuel supply pressure, is contained in the space between the fuel stream stopping element and the fuel spray outlet of the at least one fuel injection element after the fuel stream supply has been cut off, i.e. has been stopped. Consequently, the quality of the fuel spray in the fuel reformer is still rather good, even if the fuel pressure is nominally too low for achieving a good atomization of the fuel spray.

Advantageously, the fuel stream stopping element and the at least one fuel injection element can be co-designed to form one or more integral devices, for instance a fuel injection nozzle with a built-in fuel check valve. Such fuel injection nozzles with a built-in fuel spray stopping elements are known from the state of the art (for instance the LE-series nozzles provided by Danfoss or the drip-free misting nozzle provided by Steinen, see e.g. the general data sheet for Oil Nozzles Type LE by Danfoss available on the internet at http://no.varme.danfoss.com/PCMPDF/ DKBDPDQ6QD302.pdf and the information on Drip Free Misting Nozzles by Steinen also available on the internet at http://www.steinen.com/pdf/DripFree.pdf).

Further, it is also possible to co-design the valve and the fuel stream stopping element to form a single integral device. Thereby, the amount of fuel remaining in the space between the fuel stream stopping element and the at least one fuel injection element may be larger than in case where the fuel stream stopping element is arranged near or integral with such fuel injection element. But, since the necessary overall constructional space of the whole fuel injection system will be decreased in most of the cases any increase in the amount of fuel remaining in the space between the fuel stream stopping element and the at least one fuel injection element will be relatively small and can therefore usually be neglected.

In principal it is also possible and encompassed by the scope of the claimed invention, to integrate the valve, the fuel stream stopping element and the fuel injection element in one single integral device. In this case, preferably the valve is adapted to operate at high temperatures, since the fuel injection element will be arranged close to the mixing chamber of the fuel reformer which operates at high temperatures (e.g. above 400 0C). Since such valves are usually designed as magnetic valves which are electrically operated, such known standard valves can not operate properly at higher temperatures, e.g. above 100 0C. Therefore, in case such a single integrated device is used, either the system is adapted (i) to provide a cooling for the valve integrated into the device or (ii) to use a special valve designed for high temperature operation.

Further, the fuel injection system may comprise a fuel supply system comprising a fuel tank for containing the (liquid or gaseous) hydrocarbon fuel that is connected via a fuel supply line with the valve, and a pump for pressurizing the hydrocarbon fuel contained in the fuel supply line, wherein the fuel is kept in the fuel tank at a substantially constant or only slightly varying pressure level, preferably at a pressure level substantially equal to the actual atmospheric pressure the fuel injection system is exposed to.

Still further, the fuel injection system may comprise a reduction valve, preferably of the back pressure type, which is in connection with the fuel tank and the fuel supply line, thereby providing a back flow possibility for the fuel into the fuel tank in order to prevent the fuel in the fuel supply line from developing an overpressure and/or to keep the fuel in the fuel supply line at a substantially constant or only slightly varying pressure level, which corresponds to the operating pressure of the system.

Still further, the valve in the fuel injection system according to an aspect of the invention may advantageously be a 3-way valve with three ports, namely a fuel supply port, a pressure relief port and a fuel injection element connection port, wherein the fuel supply port and the pressure relief port are in connection with the fuel tank via the—pressurized—fuel supply line and via a pressure relief line, respectively. The fuel injection element connection port is—via a fuel injection element connection line—in connection with the fuel stream stopping element and subsequently with the at least one fuel injection element or directly with the at least one fuel injection element.

Alternatively, in case of more than one fuel injection element instead of having one central fuel stream stopping element for all subsequent fuel injection elements there could be more such fuel stream stopping elements, each fuel injection element being operably connected to its "own" preceding fuel stream stopping element.

The 3-way valve is preferably designed and operated in such a way that it—in its non-activated state—is closed to the pressurized fuel supply line (closed fuel supply port), while its pressure relief port is open and operably connected via the pressure relief line with the fuel tank. The fuel injection element connection port serves as input port, whereby, in case there is a certain pressure remaining at the fuel stream stopping element and/or the at least one fuel injection element respectively after the closing of the fuel supply port of the valve, the pressure in the at least one fuel injection element connection line and/or the valve can be further reduced by providing a back flow possibility of the fuel at the at least one fuel injection element respectively the fuel stream stopping element into the fuel tank.

In its activated state, the valve is closed to the pressure relief line (closed pressure relief port), and its fuel supply port is operably connected to the pressurized fuel supply line. The fuel injection element connection port serves as output port, whereby pressurized fuel is provided in the fuel injection element connection line, and subsequently at the fuel stream stopping element and/or at the at least one fuel injection element.

Preferably, the 3-way valve is electrically actuated. By temporarily activating the 3-way valve, the pressure relief line of the fuel supply system is closed and the pressurized fuel supply line of said system is opened, whereby fuel having a high pressure is supplied to the at least one fuel injection element. As soon as the pressurized fuel supply line is closed again, the pressure of the fuel is reduced to a lower pressure level, preferably substantially the actual atmospheric pressure the system is exposed to.

Preferably, the pressure of the fuel in the pressurized fuel supply line is higher than the threshold pressure of the fuel stream stopping element, so that the fuel stream stopping element is opened and providing a fuel stream of pressurized fuel at the fuel injection element once the valve is activated. As soon as the supply of pressurized fuel is terminated by closing the pressurized fuel supply line of the valve, the remaining pressure in the fuel injection element connection line is reduced by the back flow of fuel through the open fuel injection element connection port and the opened pressure relief port of the valve into the fuel tank. Thereby, a fuel supply at the at least one fuel injection element is abruptly stopped upon reaching the threshold pressure of the fuel stream stopping element by immediately closing said fuel stream stopping element. Such fuel stream stopping element could be a known check valve.

Since providing a hydrocarbon fuel stream with pulsating pressure also causes undesired fluctuations in the fuel supply lines which in turn can damage the pump and the 3-way valve and should therefore be reduced, a gas accumulator can be advantageously fitted to the fuel supply lines, preferably close to the 3-way valve. The gas accumulator serves as buffer to compensate the variations of the pressure in the fuel supply lines caused by the pulsating release of fuel injections.

According to a preferred embodiment, the 3-way valve is operated with a frequency that depends on how fast the fuel stream stopping element can stop the fuel supply. This in turn mainly depends on how fast a pressure relief through the pressure relief line can be provided. The pressure relief in turn depends on how fast the 3-way valve can be operated. Practice shows that good results can be achieved when operating the fuel supply system at rather low frequencies, thereby providing at the at least one fuel injection element (for instance an injection nozzle) a hydrocarbon fuel supply stream which pressure varies and pulsates at rather low frequencies. This pulsating hydrocarbon fuel supply stream in turn provides a correspondingly pulsating hydrocarbon fuel spray in the fuel reformer of sufficiently high quality. In addition, it allows also increasing the amount of fuel sprayed into the fuel reformer per time unit. In a preferred embodiment of the invention, the fuel stream stopping element, for instance the check valve, is operated with a frequency of less than circa 50 Hertz, preferably less than circa 20 Hertz.

Since the fuel is injected only temporarily at higher pressure values, usually the fuel injection system does not need to be designed for high pressure applications. Additionally, because of such temporarily increased pressure values the operation range of the fuel injection element can be increased by providing a possibility to operate the fuel injection system with a low fuel amount and at the same time design the fuel injection element for a larger amount of fuel that can be injected into the fuel reformer per time unit. Since the fuel spray is intermittently pulsating, the atomization or vaporization of the spray in the fuel reformer is still good. In this context, it should be noted that the mixing zone of the fuel reformer can be regarded as low pass filter which levels out the pulsations in the atomized fuel spray.

The average fuel pressure is preferably in the range of circa 8 to circa 15 bar . above atmospheric pressure, and in particular in the range of circa 10 to circa 12 bar above atmospheric pressure, whereas the pressure in the fuel reformer is usually less than circa 4 bar above atmospheric pressure, and preferably less than circa 2 bar above atmospheric pressure.

Further advantages and preferred embodiments are defined in the claims, the figure and the description.

BRIEF DESCRIPTION OF THE DRAWINGS

In the following, the principle of an aspect of the present invention shall be explained by means of a preferred embodiment shown in the single figure. The exemplarily illustrated embodiment is thereby not intended to limit the scope of the claimed invention, which is defined by the appending claims.

The single figure shows:

FIG. 1: A preferred embodiment of the inventive fuel injection system.

DETAILED DESCRIPTION

FIG. 1 shows a preferred embodiment of the inventive fuel injection system 1. The fuel injection system 1 comprises a fuel injection element 2, preferably a fuel injection nozzle of the swirl type, through which hydrocarbon fuel stored in a fuel tank 4 is sprayed into a fuel reformer (not shown). A fuel injection nozzle of the swirl type has the advantage that it produces a swirl of fuel, when releasing the fuel through one or more spray holes of the nozzle. Due to the rotational forces in the swirl and a cone arranged in the hole or in the holes, as the case may be, one or more conical sprays of atomized fuel is/are produced, which mixe(s) with other reactants like water or steam in the mixing chamber of the fuel reformer.

The tank 4 is connected with the fuel injection element 2 via a valve 10. In the Figure the valve is exemplified by a preferably magnetically operated 3-way valve 10. The 3-way valve 10 has an input port P, which is, in the following, referred to as pressurized fuel supply port P, an output port R, which is, in the following, referred to as pressure relief port R, and one input/output port C, which is, in the following, referred to as fuel injection element connection port C.

The pressurized fuel supply port P is connected via a fuel supply line p with -fuel tank 4. A pump 6 is arranged in the fuel supply line p which provides a desired pressure for the fuel supplied by fuel supply line p at the pressurized fuel supply port P. The fuel in the fuel tank 4, in turn, is kept at a substantially constant or only slightly varying pressure level, preferably at a pressure level substantially equal to the actual atmospheric pressure the fuel injection system 1 is exposed to.

Additionally, a pressure reduction valve 8 is arranged in the fuel supply line p downstream of pump 6 and connected with fuel tank 4. The pressure reduction valve 8 is preferably a back pressure valve and can be e.g. a check valve. The pressure reduction valve 8 prevents that an overpressure develops in the fuel supply line p due to an over-capacity of fuel pump 6 and keeps the fuel in the fuel supply line p at a constant or only slightly varying pressure level. In case an overpressure or a pressure variation has developed in fuel supply line p, the pressure reduction valve 8 will open and part of the fuel pumped by fuel pump 6 flows through the pressure reduction valve 8 back into fuel tank 4.

Fuel tank 4 is also connected with the pressure relief port R of valve 10 via a pressure relief line r. The fuel injection element connection port C of the 3-way valve in turn is connected via a fuel injection element connection line c and a fuel stream stopping element, e.g. a check valve 12, with the fuel injection element 2.

Additionally, a gas accumulator 14 is arranged in the pressurized fuel supply line p near the pressurized fuel supply port P of the 3-way valve 10. The gas accumulator 14 serves as butler to compensate the variations of the pressure in the fuel supply line p caused by the pulsating release of fuel injections, which will be explained more in detail below. Since the gas accumulator 14 reduces fluctuations in the fuel pressure line p (which can be quite large during operation of the fuel injection system), it can improve the lifetime and accuracy, e.g. the repeatability for injecting a certain amount of fuel, of the system.

Even if preferably liquid hydrocarbon fuel is used in the illustrated embodiment for generating a hydrogen rich gas, the inventive fuel injection system and method are also applicable to gaseous hydrocarbon fuels.

The 3-way valve is, in its non-activated state, closed in the sense that its fuel injection element connection port C is operably connected with its pressure relief port R and via the pressure relief line r with the fuel tank 4, while its pressurized fuel supply port P is closed, i.e. the pressurized fuel supply line p is disconnected from the fuel injection element connection port. C of the valve 10.

The 3-way valve is in its activated state open in the sense that its fuel injection element connection port C is operably connected with its pressurized fuel supply port P and via the pressurized fuel supply line p and the pump 6 with the fuel tank 4 while its pressure relief port R is closed, i.e. the pressure relief line r is disconnected from the fuel injection element connection port C of the valve 10.

The fuel injection element connection port C of the 3-way valve 10 is connected via a fuel injection element connection line c and via the fuel stream stopping element, e.g. the check valve 12, with fuel injection element 2. As already explained above, the fuel stream stopping element can be an integral part of the fuel injection element 2 and/or the 3-way valve 10. In the illustrated example, the fuel stream stopping element is a separate element, namely the check valve 12, arranged near the fuel injection element 2. The check, valve 12 provides a fast start and a fast stop of the supply of the hydrogen fuel supply stream to the fuel injection element 2 depending on whether the 3-way valve 10 is in its activated or de-activated state, i.e. whether the fuel supply pressure to the injection element 2 is increasing or decreasing.

In the following the operation of the fuel injection system 1 will be explained more in detail.

For providing a pulsating fuel spray in the mixing chamber of the fuel reformer, the 3-way valve 10 has to be activated. This is achieved by closing the pressure relief port R and opening the pressurized fuel supply port P and the fuel injection element connection port C. Thereby, the fuel injection element connection line c is pressurized, i.e. fuel having a predetermined pressure (by means of pump 6) is provided in the fuel injection connection line c and subsequently at the input port of the check valve 12. As soon as the pressure of the fuel in fuel injection element connection line c at the check valve 12 exceeds the predetermined pressure threshold of the check valve 12, the check valve 12 opens and fuel having a pressure above the predetermined pressure threshold is provided at the fuel injection element 2 and is subsequently sprayed into the mixing chamber of the fuel reformer.

The pressure threshold of check valve 12 in this embodiment is set (i) above the pressure of the fuel as created at the input port of check valve 12 by the pressure of the fuel stored in fuel tank 4 via relief pressure line r and the (non-activated) 3-way valve 10 (e.g. atmospheric pressure) and (ii) below the pressure of the fuel at the input port of check valve 12 as created by pump 6 via the pressurized fuel supply line p and the 3-way valve 10. A preferred pressure threshold is e.g. circa 1.5 bar above atmospheric pressure.

After a certain period of time, which preferably is adapted to the speed of operation of the 3-way valve 10 (opening/closing speed), the speed of operation of the check valve 12 (opening/closing speed) and/or the amount of fuel sprayed into the mixing chamber of the fuel reformer, and which is typically in the range of greater than circa 20 ms (corresponding to a operational frequency of 50 Hertz or less), the 3-way valve 10 is de-activated. The period of time is advantageously determined by a calibration, where the fuel amount supplied to the fuel reformer is determined in dependency of, among other, the pressure of the fuel in the fuel supply line p and the time the 3-way valve 10 has been in its activated state.

The deactivation of the 3-way valve 10 is achieved by closing the fuel supply port P and by opening the pressure relief port R to the pressure relief line r and the fuel tank 4. In this non-activated or de-activated or "neutral" position of the 3-way valve 10, (preferably liquid) hydrocarbon fuel flows back from the fuel injection element 2 through check valve 12 and 3-way valve 10 into the fuel tank 4, whereby the pressure at the fuel injection element 2, at the check valve 12 and in the fuel injection element connection line c is quickly reduced. This pressure reduction is preferably reverse quadratic, which means that the pressure is quickly reduced to a certain pressure level and then the pressure reduction is slowing down until the pressure is equal or almost equal to the pressure in the fuel tank 4. As soon as the pressure is level with the pressure in the fuel tank 4, the fuel supply at the fuel injection element 2 is stopped.

Since it has been shown in practice, that the quality of the fuel spray depends on the pressure of the fuel supplied at the fuel injection element 2, and that the fuel supply cannot be stopped by the 3-way valve in a sufficiently short time (due to the reverse quadratic pressure reduction), in order to maintain still a good quality of the fuel spray in the fuel reformer, the fuel stream stopping element, e.g. the check valve 12, has advantageously been introduced into the system and been adapted to terminate the fuel supply at the fuel injection element 2 completely as soon as the actual fuel supply pressure has fallen below a certain threshold pressure level. Thereby, an unwanted dribbling of fuel into the mixing chamber of the fuel reformer can be avoided or at least be reduced considerably.

The purpose of the check valve 12 is therefore to cut off as quickly as possible the pressure at the injection element 2 for fuel supply pressures below a certain predetermined threshold pressure level of e.g. 1.5 bar above atmospheric pressure. As soon as the actual pressure level of the fuel supply stream in the fuel injection element connection line c is below this threshold pressure level, the outlet port of the check valve 12 will be closed immediately. Since the threshold of the check valve 12 is set (i) below the operational pressure of the fuel supply stream in the fuel injection element connection line c (determined by the pressure Produced by pump 6) and (ii) well above the pressure in the fuel tank 4 (that is substantially atmospheric pressure), the overall closing operation is done very quickly and the pressure of the fuel supply stream at the fuel injection element 2 is decreasing correspondingly very quickly (i.e. much more quicker than without the use of the check valve 12).

Since the check valve 12 is preferably arranged quite close to the fuel injection element 2 or is even an integral part of the fuel injection element 2, the amount of fuel which will leave the fuel injection element 2 after the closing of the check valve 12 can in practice be neglected and its corresponding negative impact onto the quality of the fuel spray in the mixing chamber of the fuel reformer can be usually neglected, too.

After a further period of time, which preferably is adapted to the operation speed of the 3-way valve 10 (opening/closing speed), the speed of operation of the check valve 12 (opening/closing speed), and/or the amount of fuel sprayed into the mixing chamber of the fuel reformer, and which is typically in the range of less than circa 50 Hertz, the 3-way valve 10 is re-activated. As the period of time for deactivating the 3-way valve 10, the period of time for re-activating the 3-way valve 10 is also calibrated in a way similar as described above.

The re-activating of the 3-way valve 10 is achieved by closing the pressure relief port R again and by re-opening the pressurized fuel supply port P. As already explained above, in this case fuel is supplied at the fuel injection element 2 as soon as the pressure of the fuel at the check valve 12 exceeds the predetermined threshold pressure level of the check valve 12.

Since the operational parts of the fuel injection system, namely 3-way valve 10, fuel supply lines p, r, c, check valve 12, and fuel injection element 2 are subjected to high pressure only temporarily, a higher amount of fuel can be injected in the same time unit into the fuel reformer (compared with fuel supplied at a lower pressure level) without the need to design the fuel injection system for high pressure applications. On the other hand, since the fuel supply at the fuel injection element 2 can be terminated quickly, after the pressure of the fuel at the check valve 12 having reached or fallen below a certain threshold pressure level, an unwanted dribbling of fuel into the mixing chamber of the fuel reformer due to too low pressure can be avoided or at least be reduced considerably.

Preferably, the 3-way valve 10 is a magnetic valve which can be electrically activated. Additionally, the valve is preferably operated at a low frequency, particularly less than 50 Hertz. Depending on the valve type and the valve dynamics frequencies of less than 20 Hertz are suitable. In principle, the operating frequency depends on how fast the check valve 12 can be closed, which in turn depends on how fast the pressure relief is in the fuel injection element connection line c. By opening and closing of the 3-way valve 10 in the way described above in connection with the operation of the check valve 12, a fuel supply stream is provided with pulsating pressure characteristics and with fuel supply pulses of the "on-ofT type.

The pressure of the pressurized fuel in the fuel injection system is typically between circa 8 and circa 15 bar above atmospheric pressure, and preferably between circa 10 and circa 12 bar above atmospheric pressure. By providing such a low pressure in the overall system, the elements of the fuel injection system 1 need not be constructed for high pressure, whereby the costs of the overall system can be reduced. Nevertheless, the inventive fuel injection system provides a high quality fuel spray having an improved turn down ratio.

Reference List 1 hydrocarbon fuel injection system
2 hydrocarbon fuel injection element, e.g. a fuel injection nozzle 4 hydrocarbon fuel tank
6 pump
8 pressure reduction valve, e.g. a back pressure reduction valve
10 3-way valve
12 fuel stream stopping element, e.g. a check valve
14 gas accumulator
C valve input/output port, e.g. 3-way valve fuel injection element connection port
P valve input port, e.g. 3-way valve pressure relief port
R valve output port, e.g. 3-way valve pressurized fuel supply port c fuel injection element connection line r pressure relief line p pressurized fuel supply line

The invention claimed is:

1. Fuel injection system for injecting hydrocarbon fuel into a fuel reformer generating hydrogen rich gas from the hydrocarbon fuel comprising
   at least one fuel injection element for injecting hydrocarbon fuel into the fuel reformer
   a 3-way valve with a fuel supply port, a pressure relief port and a fuel injection element connection port, wherein
      the fuel supply port is in connection with a fuel tank via a fuel supply line and is adapted to receive hydrocarbon fuel from the fuel tank,
      the fuel infection element connection port is in connection with the at least one fuel injection element via a fuel injection element connection line and provides a hydrocarbon fuel stream having a pulsating pressure so that the fuel injection system injects a pulsating spray of hydrocarbon fuel into the fuel reformer, wherein the hydrocarbon fuel is provided by the fuel supply port, and
      the pressure relief port is in connection with the fuel tank via a pressure relief line and is adapted to provide hydrocarbon fuel received from the fuel injection element and/or the fuel injection connection line to the fuel tank; and
   at least one fuel stream stopping element which is arranged in the fuel injection connection line between the first port of the valve and the at least one fuel injection element, wherein the fuel stream stopping element is a check valve.

2. Fuel injection system according, to claim 1, wherein the at least one fuel stream stopping element is adapted to stop the supply of the hydrocarbon fuel stream to the at least one fuel injection element if the pressure of the fuel stream supplied at the at least one fuel injection element falls below a predetermined threshold pressure value.

3. Fuel injection system according to claim 1, wherein the at least one fuel stream stopping element and the at least one fuel injection element are co-designed to form at least one fuel injection nozzle with a built-in fuel stream stopping element.

4. Fuel injection system according to claim 1, wherein the fuel injection system comprises a fuel supply system comprising the fuel tank for containing liquid hydrocarbon fuel, and the fuel supply line, wherein downstream of the fuel tank a pump for pressurizing the hydrocarbon fuel contained in the fuel supply line is arranged, whereby the fuel in the fuel tank is at a pressure level substantially equal to the actual atmospheric pressure the fuel injection system is exposed to.

5. Fuel injection system according to claim 4, wherein the filet supply system further comprises a reduction valve which is in connection with the fuel tank and the fuel supply line, and arranged to least one of prevent the fuel in the fuel supply line from developing an overpressure and keep the fuel in the fuel supply line on a substantially constant pressure level.

6. Fuel injection system according, to claim 4, wherein the pressure of the hydrocarbon fuel in the fuel supply line supplied to the valve is in the range of circa 8 to circa 15 bar above atmospheric pressure.

7. Fuel injection system according to claim 1, wherein, in a non-activated state, the 3-way valve is closed to the pressurized fuel supply line, whereas the fuel injection element connection port is operably connected to the pressure relief line via the pressure relief port, and, in an activated state, the 3-way valve is closed to the pressure relief line, whereas the fuel injection element connection port is operably connected to the fuel supply line via the pressurized fuel supply port, wherein the 3-way valve is electrically actuated.

8. Fuel injection system according to claim 1, comprising a gas accumulator for reducing fluctuations in the hydrocarbon fuel stream pressure, wherein the gas accumulator is arranged in the fuel supply line.

9. Fuel injection system according to claim 1, wherein the valve is operated at a frequency of less than circa 50 Hz.

10. Fuel injection method for injecting hydrocarbon fuel into a fuel reformer by means of a fuel injection element for generating hydrogen rich gas from hydrocarbon fuel comprising providing a hydrocarbon fuel stream with a pulsating, pressure at the at least one fuel injection element, and injecting the liquid hydrocarbon fuel as at least one pulsating spray of hydrocarbon fuel into the fuel reformer, wherein the method is performed by a fuel injection system for injecting the hydrocarbon fuel into the fuel reformer for generating the hydrogen rich gas from the hydrocarbon fuel comprising the at least one fuel injection element for injecting hydrocarbon fuel into the fuel reformer, a 3-way valve with a fuel supply port, a pressure relief port and a fuel injection element connection port, wherein the fuel supply port is in connection with a fuel tank via a fuel supply line and is adapted to receive hydrocarbon fuel from the fuel tank, the fuel injection element connection port is in connection with the at least one fuel injection element via a fuel injection element connection line and provides a hydrocarbon fuel stream having a pulsating pressure so that the fuel injection system injects a pulsating spray of hydrocarbon fuel into the fuel reformer, wherein the hydrocarbon fuel is provided by the fuel supply port, and the pressure relief port is in connection with the fuel tank via a pressure relief line and is adapted to provide hydrocarbon fuel received from the fuel injection element and/or the fuel injection connection line to the fuel tank, and at least one fuel stream stopping element which is arranged in the fuel injection connection line between the first port of the valve and the at least one fuel injection element, wherein the fuel stream stopping element is a check valve.

11. Method according to claim 10, wherein the hydrocarbon fuel stream pressure pulsates with a frequency of less than circa 50 Hz.

12. Method according to claim 10, comprising stopping injection of the hydrocarbon fuel with the at least one fuel stream stopping element.

* * * * *